US010145391B2

(12) United States Patent
Fukuda et al.

(10) Patent No.: US 10,145,391 B2
(45) Date of Patent: Dec. 4, 2018

(54) FLUID PRESSURE CONTROL DEVICE FOR CONSTRUCTION MACHINE

(71) Applicant: KYB Corporation, Tokyo (JP)

(72) Inventors: Shunsuke Fukuda, Kanagawa (JP); Nobuyoshi Yoshida, Tokyo (JP)

(73) Assignee: KYB Corporation, Tokyo (JP)

( * ) Notice: Subject to any disclaimer, the term of this patent is extended or adjusted under 35 U.S.C. 154(b) by 169 days.

(21) Appl. No.: 15/120,773

(22) PCT Filed: Dec. 16, 2014

(86) PCT No.: PCT/JP2014/083299
§ 371 (c)(1),
(2) Date: Aug. 23, 2016

(87) PCT Pub. No.: WO2016/098185
PCT Pub. Date: Jun. 23, 2016

(65) Prior Publication Data
US 2017/0074292 A1    Mar. 16, 2017

(51) Int. Cl.
| F15B 11/17 | (2006.01) |
| F15B 11/02 | (2006.01) |
| E02F 9/22 | (2006.01) |
| F16K 11/07 | (2006.01) |

(Continued)

(52) U.S. Cl.
CPC ............ *F15B 11/17* (2013.01); *E02F 9/2228* (2013.01); *E02F 9/2239* (2013.01); *E02F 9/2253* (2013.01); *E02F 9/2267* (2013.01); *E02F 9/2282* (2013.01); *E02F 9/2285* (2013.01); *E02F 9/2292* (2013.01); *F15B 11/02* (2013.01); *F16K 11/0716* (2013.01); *F16K 15/02* (2013.01); *F16K 31/1221* (2013.01)

(58) Field of Classification Search
CPC ......... F15B 11/17; F15B 11/02; E02F 9/2253; E02F 9/2285; E02F 9/2239; E02F 9/2267; E02F 9/2282; E02F 9/2292
See application file for complete search history.

(56) References Cited

U.S. PATENT DOCUMENTS

| 7,614,225 | B2 * | 11/2009 | Kim .................... B62D 11/005 60/421 |
| 2003/0037465 | A1 * | 2/2003 | Toji ....................... E02F 9/2239 37/348 |
| 2006/0265915 | A1 * | 11/2006 | Toji ....................... E02F 9/2242 37/348 |

FOREIGN PATENT DOCUMENTS

| EP | 1847654 A2 | 10/2007 |
| JP | 2009-041616 A | 2/2009 |

\* cited by examiner

*Primary Examiner* — Thomas E Lazo
(74) *Attorney, Agent, or Firm* — Rabin & Berdo, P.C.

(57) ABSTRACT

A fluid pressure control device for a construction machine includes a first circuit system connected to the first pump; a second circuit system connected to the second pump; a switching valve having a normal position, a straight traveling position and a merging position where the working fluid of the branch section is merged into the second neutral passage; and an open/close mechanism configured to open/close the first neutral passage. In a case where at least one of the control valves, on which merging is required, on the downstream of the second traveling control valve is switched to a position other than the neutral position, by closing the first neutral passage by the open/close mechanism and switching the switching valve to the merging position, the working fluid of the first pump is merged into the working fluid of the second pump.

5 Claims, 3 Drawing Sheets

(51) Int. Cl.
*F16K 15/02* (2006.01)
*F16K 31/122* (2006.01)

US 10,145,391 B2

FLUID PRESSURE CONTROL DEVICE FOR CONSTRUCTION MACHINE

TECHNICAL FIELD

The present invention relates to a fluid pressure control device for a construction machine.

BACKGROUND ART

JP2009-41616A discloses a hydraulic control device for a power shovel. This hydraulic control device includes a first circuit system connected to a first pump, and a second circuit system connected to a second pump. In the first circuit system, a traveling control valve, an auxiliary control valve, a rotating control valve, a second boom control valve, and a first arm control valve are connected in order from the upstream side. In the second circuit system, a straight traveling control valve, a traveling control valve, a bucket control valve, a first boom control valve, and a second arm control valve are connected in order from the upstream side.

A working fluid discharged from the first pump is supplied to the control valves via a neutral passage, and also supplied to the control valves via a parallel passage provided in parallel to the neutral passage. A working fluid discharged from the second pump is supplied to the control valves via a neutral passage, and also supplied to the control valves via a parallel passage provided in parallel to the neutral passage.

SUMMARY OF INVENTION

In the power shovel as in JP2009-41616A, in a case where the straight traveling control valve is set at a neutral position, actuators connected to the control valves of the first circuit system are driven by the discharged fluid of the first pump, and actuators connected to the control valves of the second circuit system are driven by the discharged fluid of the second pump.

At this time, the boom control valve and the arm control valve are respectively provided in the first circuit system and the second circuit system. Thus, the working fluid is supplied from the two pumps of the first pump and the second pump, so that speed of a boom and an arm can be sufficiently ensured.

However, for example, the bucket control valve is provided only in the second circuit system. Thus, a bucket is driven only by the working fluid from the second pump. That is, a flow rate of the working fluid capable of being supplied to the bucket is limited. Thus, in such a case where speed of the bucket is increased, there is a possibility that the speed cannot be sufficiently increased.

The present invention has an object to provide a fluid pressure control device for a construction machine capable of increasing a flow rate of a working fluid to control valves provided in a second circuit system.

According to one aspect of the present invention, a fluid pressure control device for a construction machine including control valves that supply and discharge a working fluid supplied from a first pump and a second pump to and from actuators is provided. The fluid pressure control device includes a first circuit system connected to the first pump, the first circuit system having a first control valve group formed by a first traveling control valve and a first working control valve arranged on the downstream side of the first traveling control valve, a first neutral passage configured to return the working fluid of the first pump into a tank in a case where all the control valves of the first control valve group are placed at a neutral position, and a first parallel passage connected in parallel to the first control valve group; a second circuit system connected to the second pump, the second circuit system having a second control valve group formed by a second traveling control valve and a second working control valve arranged on the downstream side of the second traveling control valve, a second neutral passage configured to return the working fluid of the second pump into the tank in a case where all the control valves of the second control valve group are placed at a neutral position, and a second parallel passage connected in parallel to the second control valve group; a switching valve connected to the first parallel passage and the second neutral passage on the upstream side of the second control valve group, the switching valve having a normal position where the working fluid of the first pump is supplied to the first traveling control valve and the working fluid of the second pump is supplied to the second traveling control valve, a straight traveling position where the working fluid of the first pump is supplied to the first traveling control valve and the second traveling control valve and the working fluid of the second pump is supplied to the first parallel passage and the second parallel passage, and a merging position where the working fluid of the first parallel passage is merged into the second neutral passage; and an open/close mechanism configured to open/close the first neutral passage. In a case where at least one of the control valves, on which merging is required, on the downstream side of the second traveling control valve is switched to a position other than the neutral position, by closing the first neutral passage by the open/close mechanism and switching the switching valve to the merging position, the working fluid of the first pump is merged into the working fluid of the second pump.

DESCRIPTION OF EMBODIMENTS

An embodiment of the present invention will be described with reference to the drawings.

Figure 1:
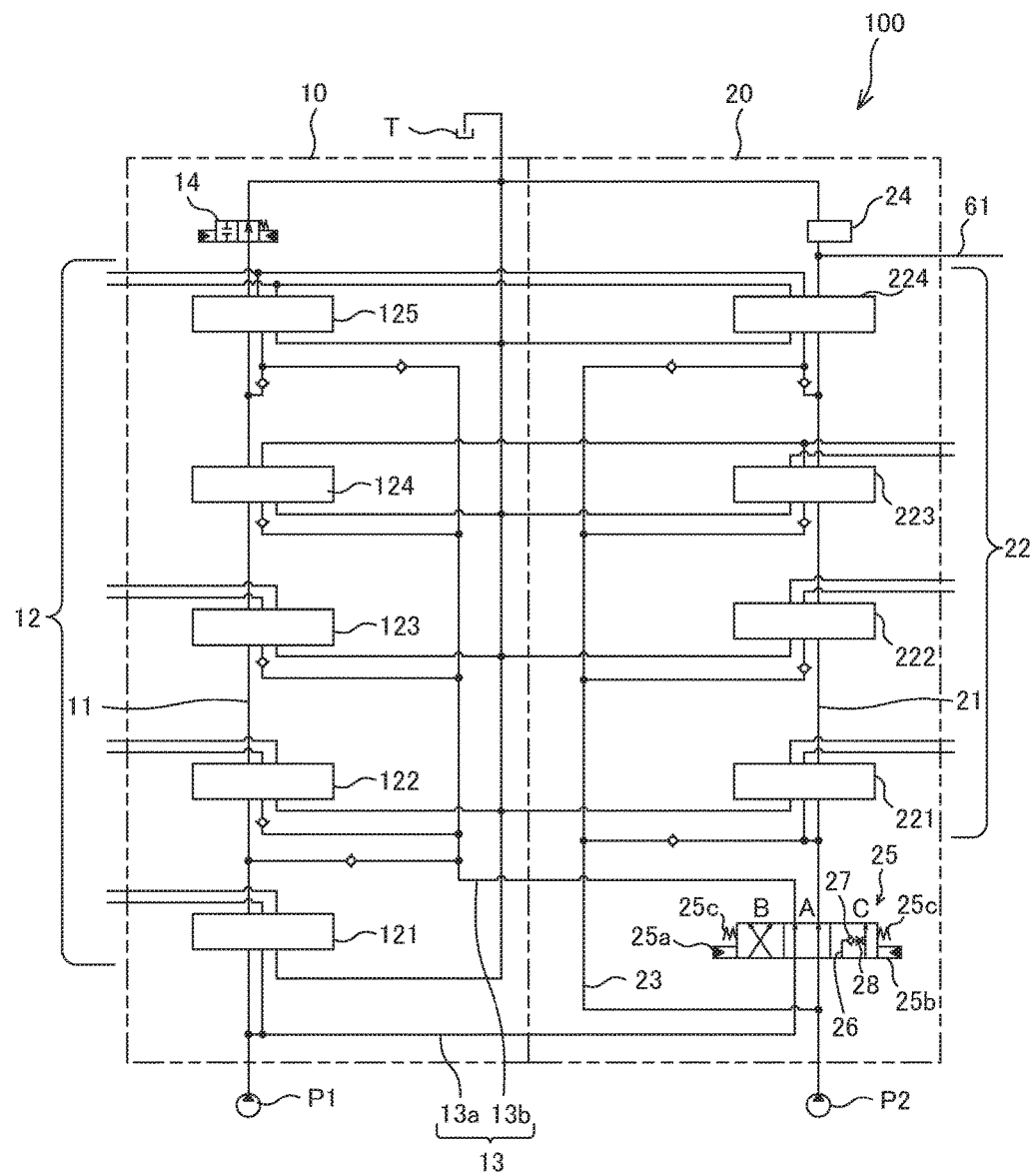
FIG. 1 is a circuit diagram showing a hydraulic control device for a construction machine according to an embodiment of the present invention.

FIG. 1 is a circuit diagram showing a hydraulic control device 100 of a construction machine in the present embodiment.

The construction machine is for example a power shovel or the like, and includes first and second pumps P1 and P2 that discharge working oil serving as a working fluid, the hydraulic control device 100 that supplies and discharges the working oil supplied from the first and second pumps P1 and P2 to and from traveling motors and actuators that drives a boom, an arm, and the like, and a tank T into which the working oil is returned from the hydraulic control device 100.

The hydraulic control device 100 includes a first circuit system 10 connected to the first pump P1, and a second circuit system 20 connected to the second pump P2.

The first circuit system 10 includes a first neutral passage 11 that guides the working oil supplied from the first pump P1 to the tank T, a first control valve group 12 connected to the first neutral passage 11 in series in order, and a first parallel passage 13 that branches from a part of the first neutral passage 11 on the upstream side of the first control valve group 12. The first control valve group 12 is connected to the first neutral passage 11 by the first parallel passage 13. The first parallel passage 13 has a branch section 13a and a first parallel passage section 13b.

The first control valve group 12 is formed by a traveling control valve 121 serving as a first traveling control valve, an auxiliary control valve 122 serving as a first working control valve, a rotating control valve 123 serving as the first working control valve, a second boom control valve 124 serving as the first working control valve, and a first arm control valve 125 serving as the first working control valve, and the control valves are arranged in this order from the upstream side. The traveling control valve 121 switches supply and discharge of the working oil to and from the traveling motor provided on the left side of a vehicle body of the power shovel. The auxiliary control valve 122 switches supply and discharge of the working oil to and from actuators that drive attachment such as a breaker and a crusher attached instead of a bucket to be described later. The rotating control valve 123 switches supply and discharge of the working oil to and from a rotating motor that rotates a rotating body arranged in an upper part of the vehicle body. The second boom control valve 124 switches supply and discharge of the working oil to and from the actuator that drives a boom. The first arm control valve 125 switches supply and discharge of the working oil to and from the actuator that drives an arm.

The first neutral passage 11 guides the working oil supplied from the first pump P1 to the tank T in a case where all the control valves 121 to 125 of the first control valve group 12 are placed at a neutral position, and blocks communication between the working oil and the tank T when at least one of the control valves 121 to 125 is switched to a working position.

The first parallel passage 13 can supply the working oil supplied from the first pump P1 to the control valves 121 to 125 in a case where any of the control valves 121 to 125 of the first control valve group 12 is switched to the working position and communication between the first neutral passage 11 and the tank T is blocked.

The first circuit system 10 further includes a neutral cut valve 14 serving as an open/close mechanism connected to a part of the first neutral passage 11 on the downstream side of the first control valve group 12. The neutral cut valve 14 opens the first neutral passage 11 in a case where the neutral cut valve is placed at a normal position shown in the figure, and closes the first neutral passage 11 when the neutral cut valve is switched to a closing position.

Meanwhile, the second circuit system 20 includes a second neutral passage 21 that guides the working oil supplied from the second pump P2 to the tank T, a second control valve group 22 connected to the second neutral passage 21 in series in order, and a second parallel passage 23 that branches from a part of the second neutral passage 21 on the upstream side of the second control valve group 22. The second control valve group 22 is connected to the second neutral passage 21 by the second parallel passage 23.

The second control valve group 22 is formed by a traveling control valve 221 serving as a second traveling control valve, a bucket control valve 222 serving as a second working control valve, a first boom control valve 223 serving as the second working control valve, and an second arm control valve 224 serving as the second working control valve, and the control valves are arranged in this order from the upstream side. The traveling control valve 221 switches supply and discharge of the working oil to and from the traveling motor provided on the right side of the vehicle body of the power shovel. The bucket control valve 222 switches supply and discharge of the working oil to and from the actuator that drives the bucket. The first boom control valve 223 switches supply and discharge of the working oil to and from the actuator that drives a boom. The second arm control valve 224 switches supply and discharge of the working oil to and from the actuator that drives an arm.

The second neutral passage 21 guides the working oil supplied from the second pump P2 to the tank T in a case where all the control valves 221 to 224 of the second control valve group 22 are placed at a neutral position, and blocks communication between the working oil and the tank T when at least one of the control valves 221 to 224 is switched to a working position.

The second parallel passage 23 can supply the working oil supplied from the second pump P2 to the control valves 221 to 224 in a case where any of the control valves 221 to 224 of the second control valve group 22 is switched to the working position and communication between the second neutral passage 21 and the tank T is blocked.

The second circuit system 20 further includes a neutral cut valve 24 connected to a part of the second neutral passage 21 on the downstream side of the second control valve group 22, and a straight traveling control valve 25 serving as a switching valve connected to a part of the second neutral passage 21 on the upstream side of the second control valve group 22 and on the downstream side of a branch point between the second parallel passage 23 and the second neutral passage 21.

The neutral cut valve 24 opens the second neutral passage 21 in a case where the neutral cut valve is placed at a normal position, and closes the second neutral passage 21 when the neutral cut valve is switched to a closing position. It should be noted that other control valve group (not shown) can be controlled from a branch passage 61 provided on the upstream of the neutral cut valve 24.

The straight traveling control valve 25 is placed between the branch section 13a and the first parallel passage section 13b of the first parallel passage 13 and connected to the second neutral passage 21, and is switchable between three positions including a normal position A shown in the figure, a straight traveling position B shown on the left side of FIG. 1, and a merging position C shown on the right side of FIG. 1. The positions A, B, C of the straight traveling control valve 25 are changed in accordance with pilot pressure acting on pilot chambers 25a, 25b provided in both ends of the straight traveling control valve 25. In a case where the pilot pressure does not act on any of the pilot chambers 25a, 25b, the straight traveling control valve 25 is placed at the normal position A.

At the normal position A, the branch section 13a is connected to the first parallel passage section 13b, and a part of the second neutral passage 21 on the upstream side of the straight traveling control valve 25 is connected to the second parallel passage 23. Thereby, the working oil of the first pump P1 is supplied to the control valves 122 to 125 of the first control valve group 12 via the first neutral passage 11 and the first parallel passage 13, and the working oil of the second pump P2 is supplied to the second control valve group 22 via the second parallel passage 23. That is, the working oil of the first pump P1 is supplied to the traveling control valve 121 of the first circuit system 10, and the working oil of the second pump P2 is supplied to the traveling control valve 221 of the second circuit system 20.

At the straight traveling position B, the branch section 13a is connected to a part of the second neutral passage 21 on the downstream side of the straight traveling control valve 25, and the part of the second neutral passage 21 on the upstream side of the straight traveling control valve 25 is connected to the first parallel passage section 13b. Thereby, the working oil of the first pump P1 is supplied to the traveling control valve 121 of the first circuit system 10 and the traveling control valve 221 of the second circuit system 20, and the working oil of the second pump P2 is supplied to the control valves 122 to 125 of the first control valve group 12 and the control valves 222 to 224 of the second control valve group 22. That is, the circuit for traveling and the circuit not for traveling are independent from each other. Thus, a straight traveling property of the vehicle body is ensured.

At the merging position C, the part of the second neutral passage 21 on the upstream side of the straight traveling control valve 25 is connected to the part of the second neutral passage 21 on the downstream side, and the branch section 13a is connected to the second neutral passage 21 via a merging passage 26 formed inside the straight traveling control valve 25. Thereby, the working oil of the first pump P1 and the working oil of the second pump P2 are merged and supplied to the second control valve group 22, so that more working oil can be supplied to the actuators connected to the control valves of the second control valve group 22.

In the merging passage 26 formed inside the straight traveling control valve 25, a check valve 27 that allows only a flow from the branch section 13a to the second neutral passage 21, and a throttle 28 that restricts a flow of the working oil in the merging passage 26 are provided in this order from the upstream side.

Thereby, the working oil of the second pump P2 can be prevented from flowing to the side of the branch section 13a, and by restricting the working oil of the branch section 13a, the working oil can be merged into the second neutral passage 21 while adjusting a merging amount from the first pump P1 to the second pump P2 at the time of a combined action of the first control valve group 12 and the second control valve group 22.

Figure 2:
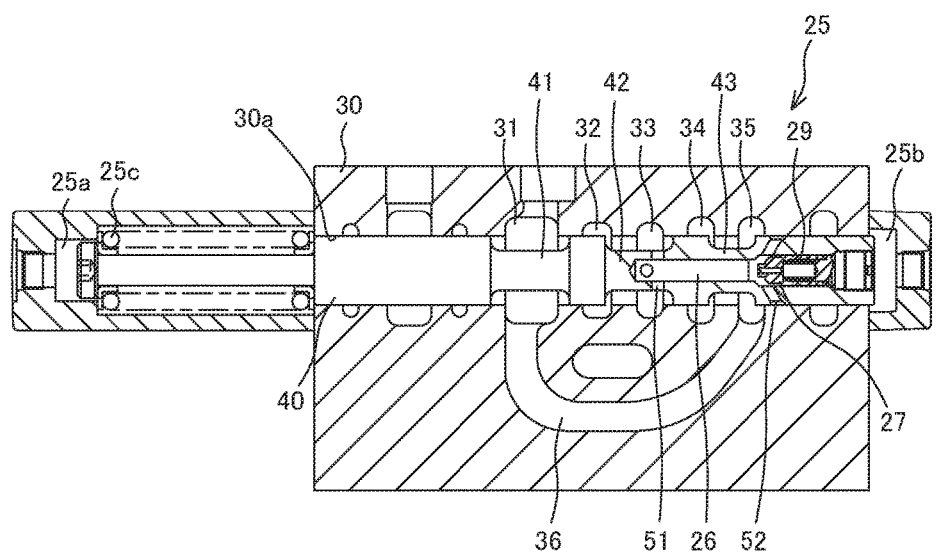
FIG. 2 is a sectional view showing a section in a case where a straight traveling control valve is placed at a neutral position.
Figure 3:
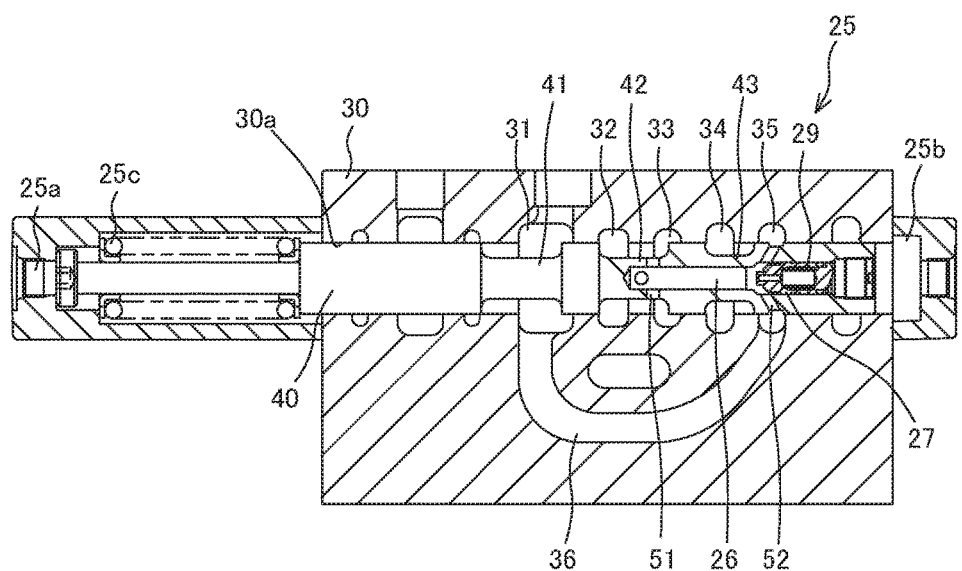
FIG. 3 is a sectional view showing a section in a case where the straight traveling control valve is placed at a normal position.

Next, a structure of the straight traveling control valve 25 will be described with reference to FIGS. 2 and 3. FIG. 2 is a sectional view showing a section in a case where the straight traveling control valve 25 is placed at the normal position A. FIG. 3 is a sectional view showing a section in a case where the straight traveling control valve 25 is placed at the merging position C.

As shown in FIG. 2, the straight traveling control valve 25 includes a valve block 30 having a cylindrical hole 30a, and a spool 40 inserted into the hole 30a, the spool being slidable in the axial direction (in the left and right direction of FIG. 2). It should be noted that in the following description, one end side of the valve block 30 will indicate the left end side in FIG. 2, and the other end side of the valve block 30 will indicate the right end side in FIG. 2.

On an inner peripheral surface of the valve block 30, a first annular groove 31 communicating with the branch section 13a, a second annular groove 32 communicating with a part of the second neutral passage 21 on the downstream side of the valve block 30, a third annular groove 33 communicating with a part of the second neutral passage 21 on the upstream side of the valve block 30, a fourth annular groove 34 communicating with the first parallel passage section 13b, and a fifth annular groove 35 communicating with the first annular groove 31 via a supply passage 36 are formed in this order from the one end side.

On an outer peripheral surface of the spool 40, a first annular recessed section 41 provided at a position to face the first annular groove 31, a second annular recessed section 42 provided from a position opposed to the second annular groove 32 to a position opposed to the third annular groove 33, and a third annular recessed section 43 provided from a position opposed to the fourth annular groove 34 to a position opposed to the fifth annular groove 35 are formed in this order from the one end side.

Inside the spool 40, the merging passage 26 extending in the axial direction is formed. The merging passage 26 has a first opening section 51 serving as the throttle 28 opened in the second annular recessed section 42, and a second opening section 52. Further, between the merging passage 26 and the second opening section 52, the check valve 27 is placed. The check valve 27 is always biased to the one end side by a spring 29 to allow only a flow of the working oil from the second opening section 52 toward the first opening section 51.

In one end of the valve block 30, a spring 25c that biases the spool 40 in the axial direction, and the first pilot chamber 25a to which the pilot pressure biasing the spool 40 to the other end side is guided are provided. In the other end of the valve block 30, the second pilot chamber 25b to which the pilot pressure biasing the spool 40 to the one end side is guided is provided.

In a case where no pilot pressure is guided to any of the first pilot chamber 25a and the second pilot chamber 25b, the spool 40 is retained at the position shown in FIG. 2. In a case where the pilot pressure is supplied to the first pilot chamber 25a, the spool 40 slides to the other end side against bias force of the spring 25c. In a case where the pilot pressure is supplied to the second pilot chamber 25b, the spool 40 slides to the one end side against the bias force of the spring 25c and is retained at the position shown in FIG. 3.

As shown in FIG. 2, in a case where no pilot pressure is guided to any of the first pilot chamber 25a and the second pilot chamber 25b, the straight traveling control valve 25 is placed at the normal position A, and the working oil guided from the branch section 13a is supplied to the fifth annular groove 35 via the first annular groove 31 and the supply passage 36, and further supplied to the first parallel passage section 13b via the third annular recessed section 43 and the fourth annular groove 34. The working oil guided from the part of the second neutral passage 21 on the upstream side of the straight traveling control valve 25 is supplied to the part of the second neutral passage 21 on the downstream side of the straight traveling control valve 25 via the third annular groove 33, the second annular recessed section 42, and the second annular groove 32.

As shown in FIG. 3, in a case where the pilot pressure is supplied to the second pilot chamber 25b, the straight traveling control valve 25 is placed at the merging position C, and communication between the second annular groove 32 and the third annular groove 33 by the second annular recessed section 42 is maintained. However, communication between the fourth annular groove 34 and the fifth annular groove 35 by the third annular recessed section 43 is blocked. Thereby, the working oil guided from the branch section 13a is supplied to the fifth annular groove 35 via the first annular groove 31 and the supply passage 36, and further supplied to the second neutral passage 21 via the second opening section 52, the check valve 27, the first opening section 51, and the second annular recessed section 42.

The part of the second neutral passage 21 on the upstream side of the straight traveling control valve 25 and the second parallel passage 23 connected to the second neutral passage 21 communicate with each other on the upstream side of the third annular groove 33. That is, at the merging position C, the working oil of the first pump P1 supplied from the branch section 13a is merged into the working oil of the second pump P2 in the second neutral passage 21, and supplied to the second parallel passage 23.

Returning to FIG. 1, a case where the straight traveling control valve 25 is switched from the normal position A to the merging position C will be described.

In a case where the straight traveling control valve 25 is placed at the normal position A, the working oil of the second pump P2 is supplied to the second control valve group 22 via the second neutral passage 21 and the second parallel passage 23. In order to actuate the bucket at normal speed, the bucket control valve 222 is switched to a position other than the neutral position, so that the working oil of the second pump P2 is supplied to the actuator that drives the bucket.

In a case where the bucket is actuated at speed higher than normal speed, the first neutral passage 11 is closed by the neutral cut valve 14 of the first circuit system 10 and the straight traveling control valve 25 is switched to the merging position C, and then the bucket control valve 222 is switched to the working position. Thereby, communication between the first neutral passage 11 and the tank T is blocked. Thus, the working oil of the first pump P1 preferentially flows to the branch section 13a and is merged into the second neutral passage 21 at the straight traveling control valve 25. The merged working oil is supplied to the bucket control valve 222 via the second parallel passage 23. Therefore, more working oil is supplied to the actuator that drives the bucket.

According to the above embodiment, the following effects are exerted.

In a case where the bucket control valve 222 is switched to the position other than the neutral position, by closing the first neutral passage 11 by the neutral cut valve 14 of the first circuit system 10 and switching the straight traveling control valve 25 to the merging position C, the working oil of the first pump P1 is merged into the working oil of the second pump P2. Therefore, the working oil is supplied to the bucket control valve 222 from the two pumps of the first pump P1 and the second pump P2. Thus, more working oil is supplied to the actuator that drives the bucket. Therefore, the bucket can be actuated at higher speed by an increased amount of the flow rate.

Further, by providing the merging position C for the straight traveling control valve 25, the working oil of the first pump P1 and the working oil of the second pump P2 are merged at the straight traveling control valve 25. Thus, there is no need for adding a new external pipe for merging or the like to the hydraulic control device 100. Thereby, only by replacing the straight traveling control valve 25 of the existing hydraulic control device 100, the working oil of the first pump P1 and the working oil of the second pump P2 can be merged. Thus, enlargement of the hydraulic control device 100 and an increase in cost can be suppressed.

Further, the straight traveling control valve 25 has the check valve 27 that allows only the flow of the working oil from the branch section 13a to the second neutral passage 21 in a case of the merging position C. Thus, in a case where pressure of the working oil in the branch section 13a is lower than pressure of the working oil in the second neutral passage 21, the working oil can be prevented from reversely flowing from the second neutral passage 21 to the branch section 13a, so that the pressure of the working oil of the second neutral passage 21 is not lowered.

Further, the straight traveling control valve 25 has the throttle 28 that restricts the flow of the working oil from the branch section 13a to the second neutral passage 21 in a case of the merging position C. Thus, by restricting the pressure of the working oil of the branch section 13a, the working oil can be merged into the second neutral passage 21 while adjusting the merging amount from the first pump P1 to the second pump P2 at the time of the combined action of the first control valve group 12 and the second control valve group 22.

Further, inside the spool 40 forming the straight traveling control valve 25, the merging passage 26 extending in the axial direction is formed. In a case of the merging position C, the merging passage 26 provides communication between the fifth annular groove 35 communicating with the branch section 13a and the second annular groove 32 communicating with the second parallel passage 23. Thereby, there is no need for providing the merging passage 26 as a new external pipe. Thus, the enlargement of the hydraulic control device 100 can be suppressed.

Further, the neutral cut valve 14 of the first circuit system 10 that closes the first neutral passage 11 at the time of switching the straight traveling control valve 25 to the merging position C is provided on the downstream side of the first control valve group 12. Thus, even in a case where the working oil of the first pump P1 is merged into the working oil of the second pump P2, the working oil of the first pump P1 can be supplied to the control valves 121 to 125 of the first control valve group 12. Thereby, even when the straight traveling control valve 25 is switched to the merging position C for operating the bucket, by driving the actuators connected to the control valves 121 to 125 of the first control valve group 12, for example, a rotating operation or the like can be performed. By providing the throttle 28, even when the control valves of the second control valve group 22 having a light load are operated, the first control valve group 12 can be operated without excessively merging the working oil into the second neutral passage 21.

The embodiments of the present invention described above are merely illustration of some application examples of the present invention and not of the nature to limit the technical scope of the present invention to the specific constructions of the above embodiments.

For example, in the above embodiment, in a case where the bucket control valve 222 is switched to the position other than the neutral position, the straight traveling control valve 25 is switched to the merging position C. However, the straight traveling control valve 25 may be switched to the merging position C in accordance with switching of a control valve other than the bucket control valve 222, which is provided on the downstream of the traveling control valve 221.

Further, in the above embodiment, the check valve 27 is provided in the merging passage 26. However, in a case where there is no need for preventing a reversed flow of the working oil from the second neutral passage 21 to the branch section 13a, the check valve 27 may be not provided.

Further, in the above embodiment, the throttle 28 is provided in the merging passage 26. However, in a case where there is no need for adjusting the merging amount from the first pump P1 to the second pump P2 at the time of the combined action of the first control valve group 12 and the second control valve group 22 by restricting the pressure of the working oil of the branch section 13a, the throttle 28 may be not provided.

Further, in the above embodiment, at the time of switching the straight traveling control valve 25 to the merging position C, the first neutral passage 11 is closed by the neutral cut valve 14 of the first circuit system 10. However, in a case where there is no need for performing a combined operation of the bucket and the boom, the first neutral passage 11 may be closed by switching the second boom control valve 124 instead of the neutral cut valve 14, or the first neutral passage 11 may be closed by switching other control valves.

The invention claimed is:

1. A fluid pressure control device for a construction machine including control valves that supply and discharge a working fluid supplied from a first pump and a second pump to and from actuators, the fluid pressure control device, comprising:
   a first circuit system connected to the first pump, the first circuit system having a first control valve group formed by a first traveling control valve and a first working control valve arranged on the downstream side of the first traveling control valve, a first neutral passage configured to return the working fluid of the first pump into a tank in a case where all the control valves of the first control valve group are placed at a neutral position, and a first parallel passage connected in parallel to the first control valve group;
   a second circuit system connected to the second pump, the second circuit system having a second control valve group formed by a second traveling control valve and a second working control valve arranged on the downstream side of the second traveling control valve, a second neutral passage configured to return the working fluid of the second pump into the tank in a case where all the control valves of the second control valve group are placed at a neutral position, and a second parallel passage connected in parallel to the second control valve group;
   a switching valve connected to the first parallel passage and the second neutral passage on the upstream side of the second control valve group, the switching valve having a normal position where the working fluid of the first pump is supplied to the first traveling control valve and the working fluid of the second pump is supplied to the second traveling control valve, a straight traveling position where the working fluid of the first pump is supplied to the first traveling control valve and the second traveling control valve and the working fluid of the second pump is supplied to the first parallel passage and the second parallel passage, and a merging position where the working fluid of the first parallel passage is merged into the second neutral passage; and
   an open/close mechanism configured to open/close the first neutral passage, wherein
   in a case where at least one of the control valves, for which merging is required, on the downstream of the second traveling control valve is switched to a position other than the neutral position, by closing the first neutral passage by the open/close mechanism and switching the switching valve to the merging position, the working fluid of the first pump is merged into the working fluid of the second pump for the control valve for which merging is required.

2. The fluid pressure control device for the construction machine according to claim 1, wherein
   the switching valve has a check valve configured to allow only a flow of the working fluid from the first parallel passage to the second neutral passage in a case of the merging position.

3. The fluid pressure control device for the construction machine according to claim 1, wherein
   the switching valve has a throttle configured to restrict a flow of the working fluid from the first parallel passage to the second neutral passage in a case of the merging position.

4. The fluid pressure control device for the construction machine according to claim 1, wherein
   the switching valve has a valve block having a cylindrical hole, and a spool slidably inserted into the hole and capable of switching the normal position, the straight traveling position, and the merging position by sliding, and
   a merging passage configured to merge the working fluid of the first parallel passage into the second neutral passage is formed inside the spool.

5. The fluid pressure control device for the construction machine according to claim 1, wherein
   the open/close mechanism opens/closes the first neutral passage on the downstream side of the first control valve group.

* * * * *